United States Patent [19]

Himono et al.

[11] 3,913,037

[45] Oct. 14, 1975

[54] BROAD BAND BALANCED MODULATOR

[75] Inventors: Yusaku Himono, Shinagawa; Yuzo Kashiwayanagi, Yokosuka; Mikio Murata, Shinagawa, all of Japan

[73] Assignee: Furukawa Electric Co., Ltd., Tokyo, Japan

[22] Filed: Dec. 17, 1973

[21] Appl. No.: 425,293

[30] Foreign Application Priority Data

Dec. 23, 1972 Japan .................. 47-2047

[52] U.S. Cl. .............. 332/43 B; 325/446; 332/51 R; 332/47

[51] Int. Cl.[2] .............. H03C 1/54

[58] Field of Search .............. 332/43 B, 43 R, 44, 47; 325/138, 446; 332/51 R, 29 M

[56] References Cited

UNITED STATES PATENTS

| | | | |
|---|---|---|---|
| 2,804,596 | 8/1957 | Hawks | 332/43 B |
| 3,184,690 | 5/1965 | Garland | 332/43 B |
| 3,327,220 | 6/1967 | Podell | 332/43 B X |
| 3,328,694 | 6/1967 | Brady et al. | 332/43 B |
| 3,461,320 | 8/1969 | Eastland | 332/43 B X |
| 3,492,603 | 1/1970 | Fredrick | 332/44 X |

*Primary Examiner*—Alfred L. Brody
*Attorney, Agent, or Firm*—George B. Oujevolk

[57] ABSTRACT

A broad band balanced modulator with a signal input side and a signal output side comprising first transformer means on the signal input side including an unbalanced-to-balanced transformer, second transformer means on the signal output side including a balanced-to-balanced transformer having a balanced coil with a center tap, rectifier means for connecting the output of said first transformer means to the input of said second transformer means, a local oscillator connected between ground and said center tap, and the size of the unbalanced-to-balanced transformer of signal input side being larger than that of said second transformer means.

5 Claims, 14 Drawing Figures

BROAD BAND BALANCED MODULATOR

BACKGROUND OF THE INVENTION

This invention relates to a broad band balanced modulator, and more particularly to a VHF-UHF broad band balanced modulator which has less conversion loss and less of a distortion factor in cases where a broad band VHF input signal of 50 to 300MHz input frequency is converted to a UHF intermediate frequency using a variable UHF local oscillator or is converted in a group to a UHF band using fixed UHF local oscillator.

Generally, as shown in FIGS. 1*a* to 1*c*, in the modulator of this type, a transformer A on the signal input side is connected to a transformer A' on the signal output side by a rectifying circuit B. There are usually used unbalanced-to-balanced transformers C and C' (called a balun transformer) as shown in FIG. 1*a*, line transformers D and D' of 1:1 windings and unbalanced-to-balanced transformers C and C' as shown in FIG. 1*b*, as the transformers A and A'. In such a case, there can also be used the transformers of the distribution type as shown in FIG. 1*c* for the transformers C and C' instead of those of direct current breaking type. There can also be used double balanced modulation which rectifies all waves by the connection of four diodes E', E',.. in FIG. 1*a* and single balanced modulation which rectifies a half wave by the connection of two diodes E and E in FIG. 1*b* as the rectifying circuit B.

In the single balanced modulation, as shown in FIG. 1*a*, when positive bias is applied to the diodes E and E by the local oscillator F, the system goes to an activated state so as to show modulating characteristics, while when negative bias is applied to the diodes E and E the system goes to an inactive state so as not to show the modulating characteristics. In the double balanced modulation, as shown in FIG. 1*b*, since one other pair of diodes E' and E' always are in the activated state even though one pair of diodes E' and E' are inactive, this system has modulating characteristics, both systems have fundamentally the same properties in view of the modulating characteristics by the diodes though the latter system double balanced modulation obtains twice the gain of the former single balanced modulation system. Although the line transformers D and D' of 1:1 windings and the unbalanced-to-balanced transformers C and C' as shown in FIG. 1*b* can obtain broader band characteristics than the unbalanced-to-balanced transformers C and C' as shown in FIG. 1*a*, both systems may be considered thought of as a type of transformer shown in FIG. 1*a* but, as a special type of transformer from which the line transformers D and D' of 1:1 windings are removed so that both are of the same type.

In the conventional modulation there are used the same type of the transformers as the transformers A and A' of signal input and output sides.

Therefore, if the aformentioned conventional modulation is used in the case of converting broad VHF signal of 50 to 300MHz to UHF an intermediate frequency of 600MHz by a variable local oscillator F of 650 to 900MHz, low conversion loss and low distortion characteristics can not be obtained for all bands of the input signal. When the characteristics of a single balanced modulation using the balun transformer in which bifilar coils of 0.16mm in diameter are wound four times on the ferrite core of 3mm in inner diameter, 6mm in outer diameter and 2mm in thickness, and the line transformer is 1:1 in which bifilar coils of the same diameter are wound twice on the ferrite core of 2mm in inner diameter, 4mm in outer diameter and 2mm in thickness is precisely investigated as a conventional modulation showing many considerably good characteristics, as shown by marks *x* in FIGS. 5*a* and 5*b*, the conversion loss and distortion factor of the conventional modulation show deterioration at the upper side of the band. Here, the value of the distortion factor of the modulation is of third-order intermodulation with two waves of 1MHz off-set of 90dB$\mu$V/75 ohms to the input, and if a further desirable value of the upper side band frequency is to be obtained, then the characteristics of the lower side band frequency deteriorates with the result that desirable characteristics cannot be obtained in a broad band.

SUMMARY OF THE INVENTION

It is, therefore, an object of the present invention to provide a broad band balanced modulator which may eliminate the disadvantages of the conventional modulation.

It is another object of the present invention to provide a broad band balanced modulator which may improve the broad band characteristics of VHF-UHF modulation.

According to the present invention, one characteristic feature of the balanced modulator is that the transformers of the input and output sides are so made differently so that the induction, concretely the shape the size of the core or number of turn of the bifilar coil of the transformer of output side is not larger than those of the transformer of input side and the oscillated wave of the local oscillator is applied from the output side.

According to the present invention, another characteristic feature of the balanced modulator contemplated herein is such that an electrostatic capacitor is provided between a ground point and at least one balanced intermediate point of the input and output sides.

BRIEF DESCRIPTION OF THE DRAWING

These and other objects, features and advantages of the broad band balanced modulator will become more fully apparent from the following description taken in conjunction with the accompanying drawings, in which:

FIGS. 1*a* to 1*c* show electric circuits of the conventional balanced modulator, wherein FIG. 1*a* is a circuit diagram of single balanced modulation using unbalanced-to-balanced transformers, FIG. 1*b* is a circuit diagram of double balanced modulation using line transformers of 1:1 windings and unbalanced-to-balanced transformers, and FIG. 1*c* is a circuit diagram of the transformer of distribution type;

FIGS. 2*a* to 2*c* show electric circuits of one embodiment of a balanced modulator according to the present invention, wherein FIG. 2*a* is a circuit diagram of one embodiment of the balanced modulator according to the present invention, FIG. 2*b* is an actual wiring of the essential part of the balanced modulator of the present invention, and FIG. 2*c* is a circuit diagram of the balanced modulator accommodating a capacitor according to the present invention;

DESCRIPTION OF THE PREFERRED EMBODIMENT

Figure 1A:
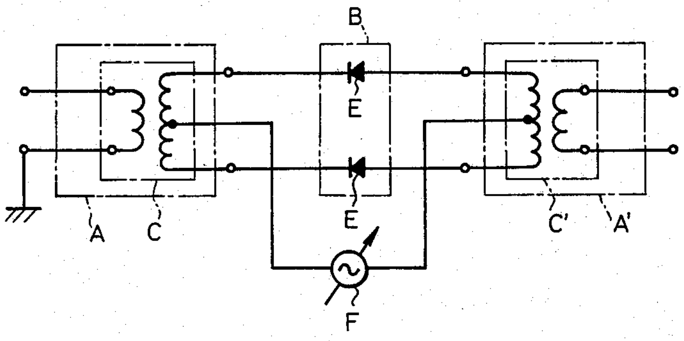
FIG. 1a PRIOR ART
Figure 1B:
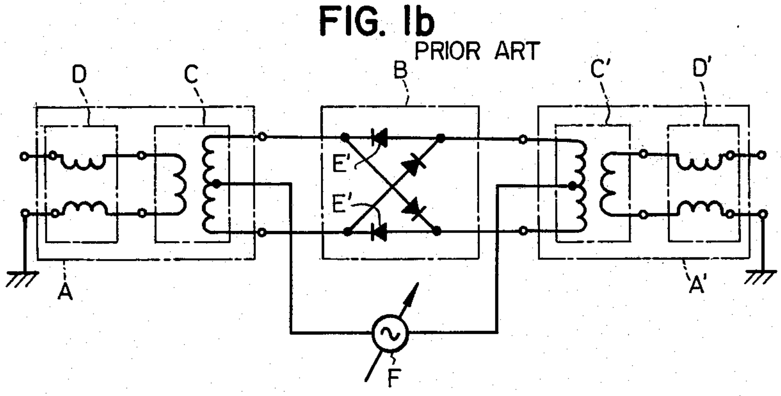
FIG. 1b PRIOR ART
Figure 1C:
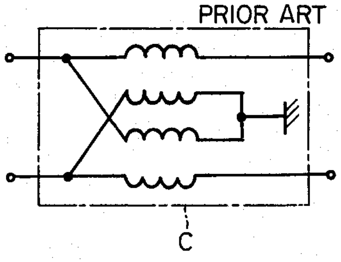
FIG. 1c PRIOR ART
Figure 2A:
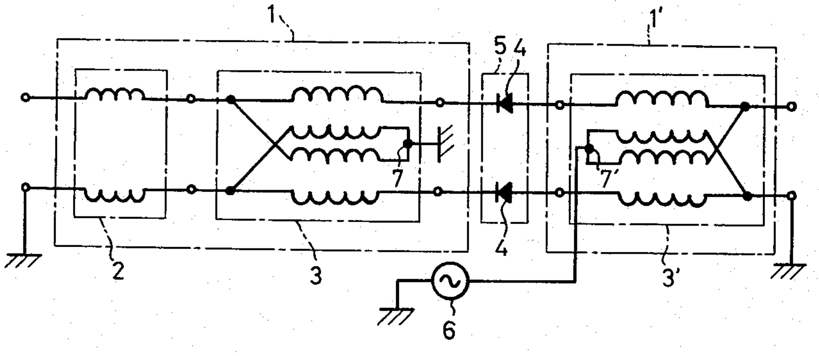
Figure 2B:
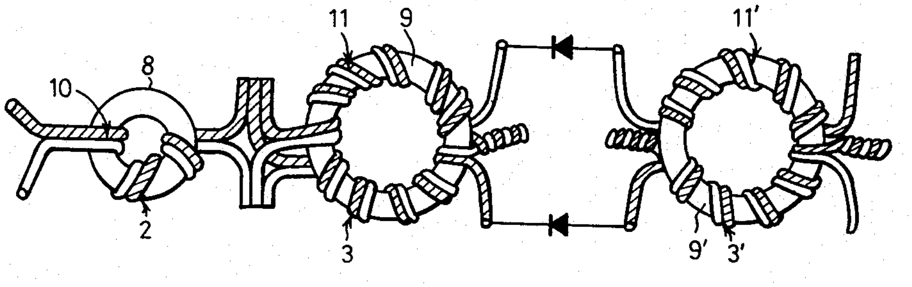
Figure 2C:
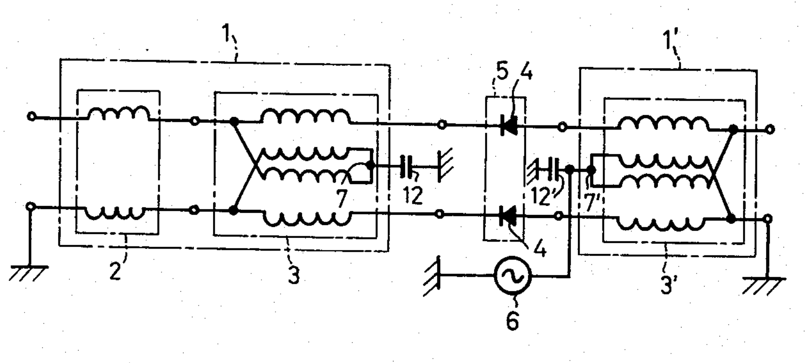

Referring now to FIGS. 2a to 2c, which show one embodiment of the balanced modulator of the present invention, the balanced modulator, as shown in FIG. 2a, comprises a transformer 1 on the signal input side which includes a line transformer 2 with a 1:1 turn ratio of primary and secondary windings and an unbalanced-to-balanced transformer 3 of distribution type, a transformer 1′ of signal output side formed with balanced-to-unbalanced transformer 3′ of distribution type, two diodes 4 for connecting the output of the transformer 1 of signal input side to the input of the transformer 1′ of the signal output side to form a rectifying circuit 5, as single balanced modulation. A local oscillator 6 is connected at its output to the intermediate tap 7′ of the balanced winding of the transformer 1′ of signal output side so as to supply the local oscillating waves thereto. The line transformer 2 and unbalanced-to-balanced transformer 3 and balanced-to-unbalanced transformer 3′ may have cores 8, 9 and 9′ of ring shape or any other shape, and bifilar coils 10, 11 and 11′, as shown in FIG. 2b, or trifilar coils or any other coils wound of the cores 8, 9 and 9′. This embodiment of the balanced modulator means that the number of turn of the line transformer of 1:1 turn ratio of primary and secondary windings in the conventional transformer of signal output side is reduced to zero, and thus difference is provided between the number of turn of the transformers 1 and 1′ of signal input and output sides, because even if both the unbalanced-to-balanced transformer 3 and balanced-to-unbalanced transformer 3′ have the same shape and number of turn in this embodiment, the transformer 1 of signal input side has the line transformer 2, but the transformer 1′ of output side does not have the line transformer so that the difference is provided therebetween as a whole of the transformers 1 and 1′.

In this embodiment, both the transformers 1 and 1′ of input and output sides may have only the unbalanced-to-balanced transformer 3 and balanced-to-unbalanced transformer 3′, and, in this case, the difference may be provided by varying the shape, number of turn, or both the shape and number of turn of the transformers 3 and 3′.

In another aspect of this embodiment, both the transformers 1 and 1′ of input and output sides may have both the line transformers 2 and 2′ of 1:1 turn ratio of primary and secondary windings thereof, respectively and unbalanced-to-balanced transformer 3 and balanced-to-unbalanced transformer 3′, and, in this case, the difference may be similarly provided by varying the shape, number of turn, or both the shape and number of turn of the transformers 3 and 3′ and/or the line transformers 2 and 2′, respectively.

The balanced modulator shown in FIG. 2c comprises, in addition to the constitution of the single balanced modulation shown in FIG. 2a, capacitors 12 and 12′ of small capacity connected between the intermediate taps 7 and 7′ of the balanced coils of the transformers 3 and 3′ of signal input and output sides, respectively and the earth.

Figure 3:
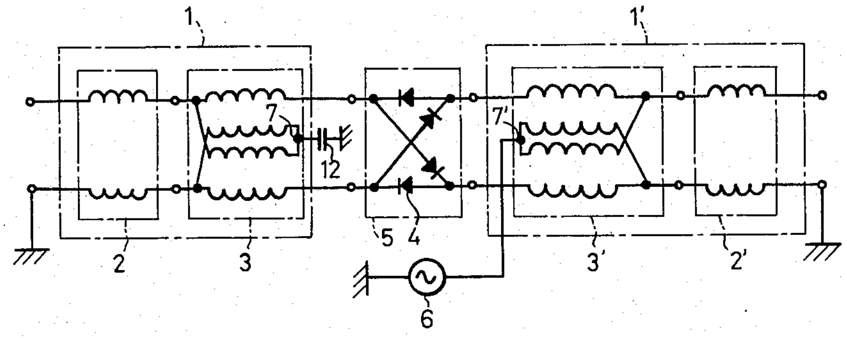
FIG. 3 is a circuit diagram of another embodiment of the balanced modulator of this invention.

Referring to FIG. 3, which shows another embodiment of the balanced modulator of the present invention, both the transformers 1 and 1′ of the signal input and output sides have line transformeres 2 and 2′, of 1:1 turn ratio of primary and secondary windings thereof, and unbalanced-to-balanced transformer 3 and balanced-to-unbalanced transformer 3′, respectively in such a manner that the difference is provided in the dimensions of the respective cores and number of turns of the bifilar coils, and that a capacitor 12 is grounded only at the intermediate tap 7 of the balanced coil of the transformer 1 of signal input side, and four diodes 4, 4,.. are used in a rectifying circuit 5 as double balanced modulation.

In this embodiment, bifilar coils may be replaced with trifilar coils or any other coils which function similarly thereto.

Figure 4:
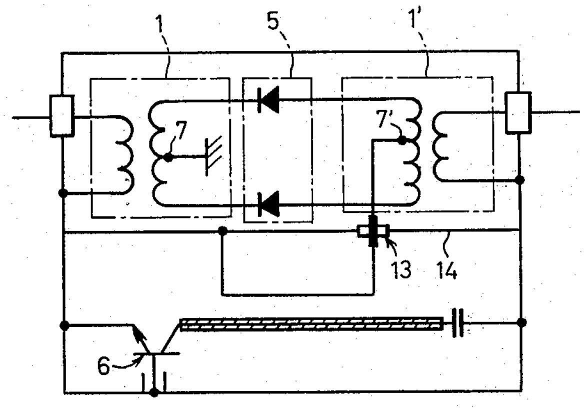
FIG. 4 is a schematic circuit diagram of the balanced modulator using hermetic terminals instead of a capacitor.

In the embodiment shown in FIG. 4, which shows still another embodiment of the balanced modulator according to the present invention, the local oscillating output may be taken out from a local oscillator 6 by a couple, and lead-through type or hermetic type terminal 13 having a small amount of capacitance with respect to ground which may be mounted on a metal shield plate 14 so that the local oscillating output from the local oscillator 6 through the terminal 13 may be introduced to the intermediate tap 7′ of the balanced coil of the transformer 3′ of signal output side. If thus constructed, it is not necessary to ground the small capacitance capacitor from the intermediate tap 7′ of the balanced coil of the transformer 3′ of signal output side as above, but it may improve the mechanical stability of the balanced modulator with terminal 13.

Figures 5A, 5B, 6A, 6B:
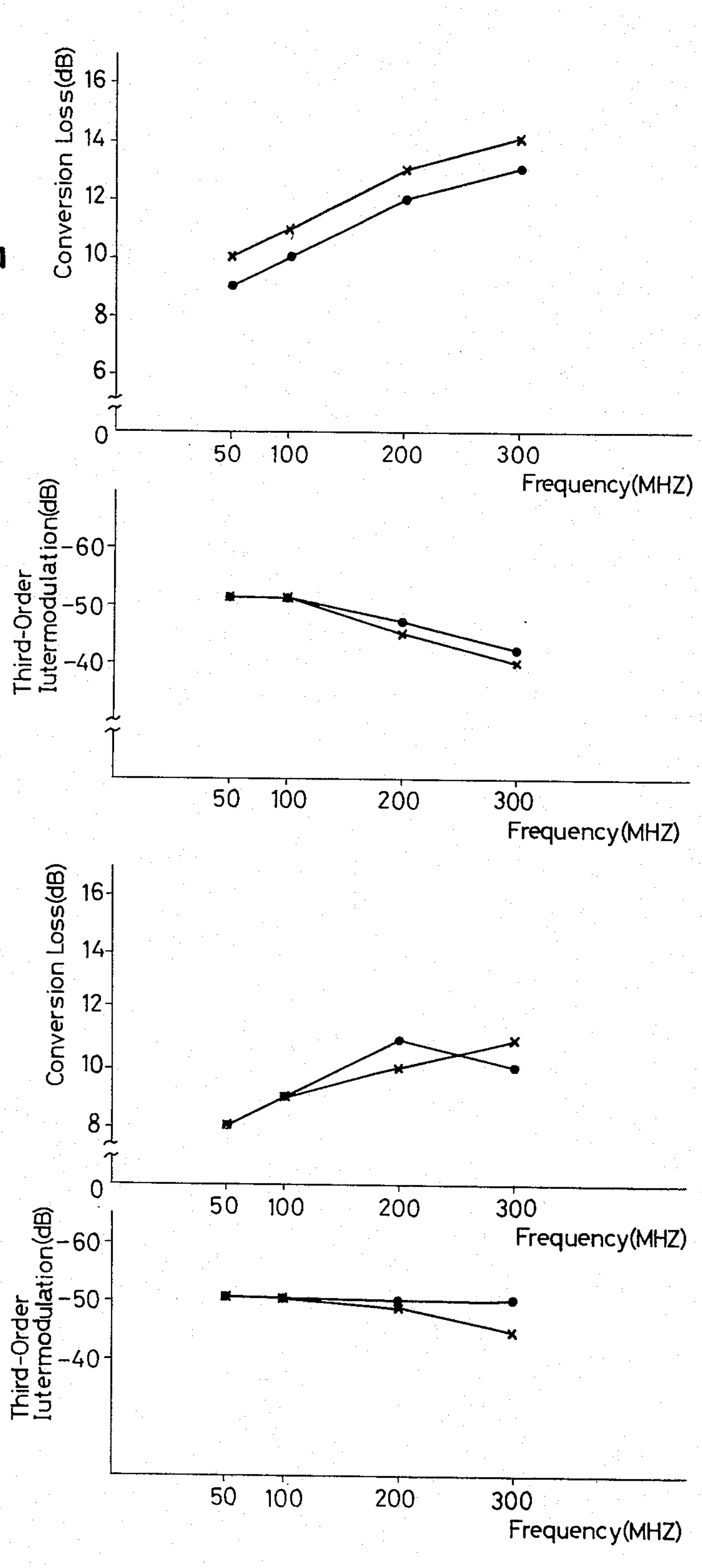
FIG. 5a PRIOR ART, FIG. 5b PRIOR ART, FIG. 6a, FIG. 6b
FIG. 5a is a graph showing the conversion loss in term of frequency of the conventional balanced modulator.
FIG. 5b is a graph showing the distortion characteristics in term of frequency of the conventional balanced modulator.
FIG. 6a is a graph showing the conversion loss in term of frequency of the balanced modulator of the present invention.
FIG. 6b is a graph showing the distortion characteristics in term of frequency of the balanced modulator of the present invention.

The aformentioned balanced modulator of the present invention so constructed that a difference is provided in the size of the coils and number of turns of the coils of the transformer 1′ of the signal output side are less than those of the transformer 1 of the signal input side and that the local oscillating waves from the local oscillator 6 are applied to intermediate tap 7′ of the balanced coil of the transformer 1′ of signal output side, will provide improvement in conversion loss and third-order intermodulation as shown by the dot marks "." in FIGS. 5a and 5b as a result of comparison experimentation with the balanced modulator composed of the transformer 1 on the signal input side which is the same as the conventional one and the same balun of the transformer 1′ on the signal output side.

Further, in the embodiment in which at least one intermediate tap 7 or 7′ of the balanced coil of the transformer 3 or 3′ of the signal input or output side is grounded by an electrostatic capacitor of small capacitance, using 2$p$F of capacitor 12 in the balanced modulator shown in FIG. 2*c*, as shown by the mark $x$ in FIG. 6, and using 2$p$F of capacitor 12' in the same balanced modulator, as shown by the dot mark . in FIG. 6, improved results are shown.

Figure 7A:
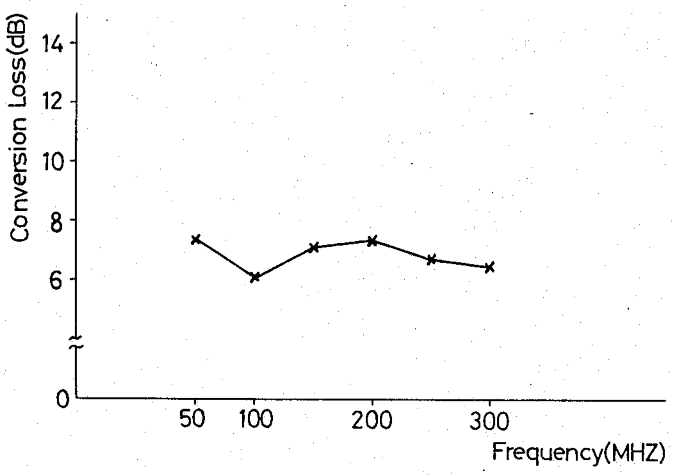
FIG. 7a is a graph similar to FIG. 6a, but showing another embodiment of the present invention.
Figure 7B:
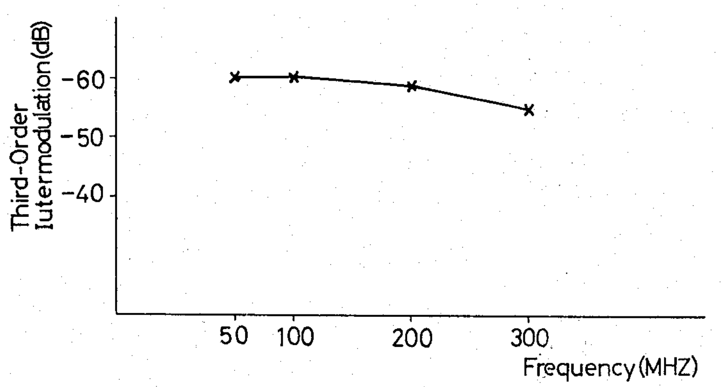
FIG. 7b is a graph similar to FIG. 6b, but showing another embodiment of the present invention.

The embodiment shown in FIG. 3 of double balanced modulation having the transformer 1 of signal input side including the line transformer 2 of 1:1 turn ratio of primary and secondary windings thereof is so formed that a bifilar coil of 0.16mm in diameter is wound by 5.5 turns on the ferrite core of 3mm in inner diameter, 6mm in outer diameter and 2mm in thickness. The balun 3 is so formed that the bifilar coil of the same diameter is wound by 3.5 turns on the same ferrite core as above, and the transformer 1' of the signal output side including the balun 3' is so formed that the bifilar coil is wound by 3.5 turns on the ferrite coil of 2mm in inner diameter, 4mm in outer diameter and 2mm in thickness. The line transformer 2' of 1:1 of turn ratio of primary and secondary windings is so formed that the same bifilar coil is wound by 5.5 turns on the same ferrite core as that used for output transformer 3'. Capacitors 12 and 12' of 1.5$p$F are grounded at the intermediate taps 7 and 7', of the balanced coils of the transformers 3 and 3', the characteristics are shown in FIGS. 7*a* and 7*b* as broadly improving the characteristics of conversion loss and third-order intermodulation.

What is claimed is:

1. A broad band balanced modulator with a signal input side and a signal output side comprising:

a. first transformer means on the signal input side including a first toroidal line transformer of 1:1 turn ratio of primary and secondary windings and an unbalanced-to-balanced transformer;

b. second toroidal transformer means on the signal output side including a balanced-to-unbalanced transformer with a tap including a second line transformer of 1:1 turn ratio of primary and secondary windings;

c. rectifier means connecting the output of said first transformer means to the input of said second transformer means;

d. a local oscillator connected between ground and said tap; and, e. the toroidal size of said first transformer means being larger than that of said second transformer means.

2. A broad band balanced modulator as set forth in claim 1 wherein the unbalanced-to-balanced and balanced-to-unbalanced transformers of signal input and output sides are the same size, and the size of said first line transformer is larger than that of said second line transformer.

3. A broad band balanced modulator as set forth in claim 1, wherein the first and second line transformers are the same, and the size of said unbalanced-to-balanced transformer of signal input side is larger than that of the balanced-to-unbalanced transformer.

4. A broad band balanced modulator as set forth in claim 1, further including a capacitor connected to the ground and to said tap.

5. A broad band balanced modulator as set forth in in claim 1, further including a metal shield plate and a hermetic terminal having capacitance with respect to the ground of small capacity mounted in said metal shield plate to introduce the output of said local oscillator to said tap.

* * * * *